United States Patent
Sheaffer

(10) Patent No.: US 12,069,431 B2
(45) Date of Patent: Aug. 20, 2024

(54) JOINT PROCESSING OF OPTICAL AND ACOUSTIC MICROPHONE SIGNALS

(71) Applicant: Apple Inc., Cupertino, CA (US)

(72) Inventor: Jonathan D. Sheaffer, San Jose, CA (US)

(73) Assignee: Apple Inc., Cupertino, CA (US)

( * ) Notice: Subject to any disclaimer, the term of this patent is extended or adjusted under 35 U.S.C. 154(b) by 135 days.

(21) Appl. No.: 17/749,068

(22) Filed: May 19, 2022

(65) Prior Publication Data

US 2023/0379636 A1 Nov. 23, 2023

(51) Int. Cl.
*H04R 23/00* (2006.01)
*G01H 9/00* (2006.01)
*G06F 3/16* (2006.01)
*H04R 3/00* (2006.01)

(52) U.S. Cl.
CPC ........... *H04R 23/008* (2013.01); *G01H 9/002* (2013.01); *G06F 3/165* (2013.01); *H04R 3/005* (2013.01)

(58) Field of Classification Search
CPC .. H04R 2430/20; H04R 25/40; H04R 23/008; H04R 3/005
USPC ................ 381/56, 92, 94.1–94.3, 94.5, 94.7
See application file for complete search history.

(56) References Cited

U.S. PATENT DOCUMENTS

| | | | | |
|---|---|---|---|---|
| 7,242,778 B2 * | 7/2007 | Csermak | ............... | H04R 25/305 381/60 |
| 8,929,564 B2 * | 1/2015 | Kikkeri | ............... | G10L 21/0216 381/94.1 |
| 9,002,036 B2 * | 4/2015 | Harney | ............... | H04R 1/245 381/357 |
| 9,666,191 B1 * | 5/2017 | Bakish | ............... | G08C 23/04 |
| 10,327,069 B2 * | 6/2019 | Fishman | ............... | H04R 19/04 |
| 10,743,564 B2 * | 8/2020 | Rayner | ............... | A23K 50/48 |
| 11,228,849 B2 * | 1/2022 | Piechowiak | ............... | H04R 25/505 |
| 11,617,035 B2 * | 3/2023 | Meyer | ............... | H04N 7/147 381/92 |
| 2021/0074316 A1 | 3/2021 | Souden et al. | | |
| 2023/0308811 A1 * | 9/2023 | Nakamura | ............... | H04R 19/04 381/58 |

* cited by examiner

*Primary Examiner* — Disler Paul
(74) *Attorney, Agent, or Firm* — BAKERHOSTETLER

(57) ABSTRACT

Aspects of the subject technology provide for joint processing of signals from acoustic microphones and signals from vibration sensors that directly or remotely sense vibrations of the source of the sound itself. The vibration sensors may include remote vibration sensors such as a light-based microphone, which may be implemented as an optical microphone. Joint processing of the signals may include detecting a sound from the source in the signals from the acoustic microphone by selecting a portion of the signals from the acoustic microphone based on the signals from the vibration sensor.

19 Claims, 6 Drawing Sheets

JOINT PROCESSING OF OPTICAL AND ACOUSTIC MICROPHONE SIGNALS

TECHNICAL FIELD

The present description relates generally to processing audio signals, including, for example, joint processing of optical and acoustic microphone signals.

BACKGROUND

An electronic device may include a microphone. The microphone may produce audio signals responsive to a sound from a source, such as a user speaking to the device.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
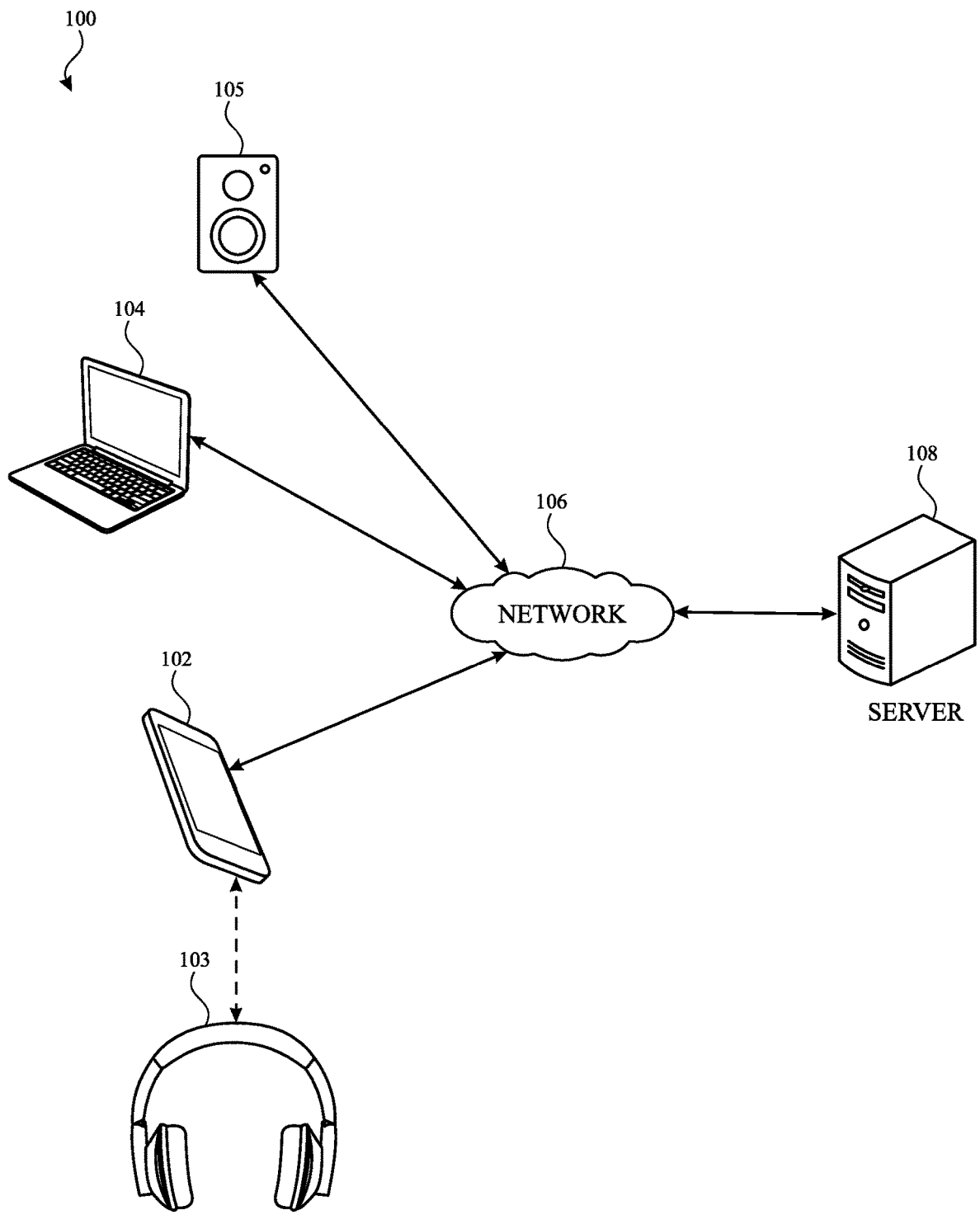
FIG. 1 illustrates an example network environment for joint processing of optical and acoustic microphone signals in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

An electronic device or other apparatus may include multiple microphones. The microphones may produce audio signals, which may contain sounds from one or more sound sources. For example, the sound sources may include one or more of a user who is speaking to the device or apparatus, a bystander who is not the user of the device or apparatus but whose voice may be captured by device microphones, and/or environmental noise (e.g., wind, traffic, and the like). Thus, there may be a variety of acoustic environmental conditions that may interfere with a speech signal that is captured by device microphone(s). The environmental conditions may interfere with real-time applications such as voice trigger phrase detection, hands free telephony, and automatic speech recognition that may be performed by processing a speech signal.

Aspects of the subject technology provide for enhancing source detection and/or output based on audio signals captured by device microphones. For example, the subject systems and methods may employ one or more vibration sensors, such as a light-based microphone (e.g., an optical microphone), an accelerometer, or the like, to aid in the detection of audio sources such as speech from a user of an electronic device or other apparatus.

For example, acoustic microphones (e.g., microphones that sense sound when a diaphragm or other sound-responsive element of the microphone moves in response to incoming sound and generate an electrical signal based on the movement) can often provide sufficient Signal-to-Sensor-Noise-Ratio (SSNR) performance. However, the performance of acoustic microphones can be negatively affected in some adverse acoustic conditions involving high levels of ambient noise and/or wind. Optical microphones are sometimes used to detect sound, but can exhibit a relatively poor SSNR and limited bandwidth. However, optical microphones can provide improved directionality and therefore can sometimes perform well in the presence of interfering acoustic noise. Accordingly, it would be beneficial to take advantage of the high SSNR performance of acoustic microphones and the directionality of optical microphones. However, because of the different operating principles of acoustic and optical microphones, challenges can arise when attempting to jointly process signals from acoustic and optical microphones.

In accordance with aspects of the disclosure, joint processing of optical and acoustic microphone signals is provided. For example, in accordance with various aspects, jointly capturing and processing signals from optical and acoustical microphones can result in improved microphone performance in adverse acoustic conditions, while reducing or minimizing negative effects on audio quality. In accordance with one or more implementations, a microphone signal from a light-based microphone, such as an optical microphone, can be used to select a portion of an acoustic microphone signal that is representative of a source of a sound (e.g., a source of interest such as the voice of a user of an electronic device or a voice of a person at a particular location). In accordance with one or more implementations, a microphone signal from a light-based microphone may be time-aligned with a microphone signal from an acoustic microphone to account for a difference between light speed and sound speed. In accordance with one or more implementations, a discrepancy between a microphone signal from an acoustic microphone and a microphone signal from a light-based microphone may be used to steer (e.g., mechanically and/or programmatically) the acoustic microphone and/or the light-based microphone.

FIG. 1 illustrates an example network environment for processing audio signals including, for example, joint processing of acoustic microphone signals and additional signals in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 102, an electronic device 104 and an electronic device 105, a wireless audio input/output device 103, a network 106, and a server 108. The network 106 may communicatively (directly or indirectly) couple, for example, one or more of the electronic device 102, the electronic device 104, the electronic device 105 and/or the server 108. In FIG. 1, the wireless audio input/output device 103 is illustrated as being coupled to the network 106 via the electronic device 102; however, in one or more implementations, the wireless audio input/output device 103 may be directly coupled to the network 106, coupled to the network 106 via another electronic device, or may be coupled to the electronic device 102, the electronic device 104, and/or the electronic device 105 without being coupled to the network 106.

The network 106 may be an interconnected network of devices that may include, or may be communicatively coupled to, the Internet. In one or more implementations, connections over the network 106 may be referred to as wide area network connections, while connections between the electronic device 102 and the wireless audio input/output device 103 may be referred to as peer-to-peer connections. For explanatory purposes, the network environment 100 is illustrated in FIG. 1 as including three electronic devices (e.g., the electronic device 102, the electronic device 104, and the electronic device 105), a single wireless audio input/output device 103, and a single server 108; however, the network environment 100 may include any number of electronic devices, wireless audio input/output devices and/or servers, and/or other apparatus such as a vehicle, a train car, an aircraft, a watercraft or the like that may include one or more acoustic microphones and/or one or more light-based microphones or vibration sensors. For example, the form factor of one or more of the electronic device 102, the electronic device 104, and the electronic device 105 may be different from the form factor shown in FIG. 1. For example, in one or more implementations, the electronic device 102 may be implemented as a movable platform, such as a train car, an aircraft, a vehicle, a watercraft or the like.

The server 108 may be, and/or may include all or part of the electronic system discussed below with respect to FIG. 9. The server 108 may include one or more servers, such as a cloud of servers. For explanatory purposes, a single server 108 is shown and discussed with respect to various operations. However, these and other operations discussed herein may be performed by one or more servers, and each different operation may be performed by the same or different servers.

Each of the electronic device 102, the electronic device 104, and the electronic device 105 may be, for example, a portable computing device such as a laptop computer, a smartphone, a peripheral device (e.g., a digital camera, headphones), a tablet device, a smart speaker, a set-top box, a content streaming device, a wearable device such as a watch, a band, and the like, a somewhat larger device such as desktop computer, a portable audio system, a home audio system, or any other appropriate device or system that includes one or more microphones and one or more wireless interfaces, such as one or more near-field communication (NFC) radios, WLAN radios, Bluetooth radios, Zigbee radios, cellular radios, and/or other wireless radios. In FIG. 1, by way of example, the electronic device 102 is depicted as a smartphone, the electronic device 104 is depicted as a laptop computer, and the electronic device 105 is depicted as a smart speaker. Each of the electronic device 102, the electronic device 104, and the electronic device 105 may be, and/or may include all or part of, the electronic device discussed below with respect to FIG. 2, and/or the electronic system discussed below with respect to FIG. 9.

The wireless audio input/output device 103 may be, for example, a wireless headset device, wireless headphones, one or more wireless earbuds (or any in-ear, against the ear or over-the-ear device), a smart speaker, or generally any device that includes audio input circuitry (e.g., a microphone) and/or one or more wireless interfaces, such as near-field communication (NFC) radios, WLAN radios, Bluetooth radios, Zigbee radios, and/or other wireless radios. In FIG. 1, by way of example, the wireless audio input/output device 103 is depicted as a set of wireless earbuds.

As is discussed further below, one or more of the electronic device 102, the electronic device 104, and the electronic device 105 and/or the wireless audio input/output device 103 may include one or more microphones that may be used, in conjunction with the architectures/components described herein, for enhanced detection of sound from a source. The microphones in any one of the electronic device 102, the electronic device 104, the electronic device 105 and/or the wireless audio input/output device 103 may include one or more acoustic microphones, and/or one or more light-based microphones, such as one or more optical microphones. As described herein, an acoustic microphone may be a microphone that includes a moveable diaphragm that moves (e.g., vibrates) in response to incoming sound, and in which the movement of the moveable diaphragm generates an electrical signal (e.g., an acoustic microphone signal) corresponding to the incoming sound. A light-based microphone may be a microphone that includes a light source that projects light onto a source of a sound and that includes a light sensor that detects vibrations of the source of the sound itself using a portion of the projected light that is reflected from the source of the sound and received by the light sensor. Although light-based microphones are described herein in various examples for sensing vibrations of the source of a sound (and are therefore referred to herein as vibration sensors in some examples), it is also contemplated that other vibration sensors (e.g., accelerometers) or light-based sensors (e.g., depth sensors, cameras, etc.) may be capable of detecting sound generated by a source via detection of the vibrations of the source itself.

The wireless audio input/output device 103 may be, and/or may include all or part of, the wireless audio input/output device discussed below with respect to FIG. 2, and/or the electronic system discussed below with respect to FIG. 9. In one or more implementations, the wireless audio input/output device 103 may be paired, such as via Bluetooth, with the electronic device 102 (e.g., or with one of the other electronic devices of FIG. 1). After the electronic device 102 and the wireless audio input/output device 103 are paired, the electronic device 102 and the wireless audio input/output device 103 may automatically form a secure peer-to-peer connection when located proximate to one another, such as within Bluetooth communication range of one another.

The electronic device 102 may stream audio, such as music, a user's voice (e.g., during phone calls or audio and/or video conferences), and the like, to the wireless audio input/output device 103 for output by a speaker of the wireless audio input/output device 103. The electronic device 102 may also, or alternatively, transmit audio, such as music, a user's voice (e.g., during phone calls or audio and/or video conferences), and the like to a remote electronic device, such as an electronic device of another user. For example, an audio signal including the voice of the user of the electronic device 102 (e.g., and/or sound from one or more additional sources, such as ambient noise) may be received by one or more microphones of the electronic device 102 and/or the wireless audio input/output device 103, processed by the electronic device 102 and/or the wireless audio input/output device 103 as described herein, and transmitted to the remote device, used as input to the electronic device 102, and/or output by one or more speakers of the electronic device 102 and/or the wireless audio input/output device 103. For explanatory purposes, the subject technology is described herein with respect to a wireless connection between the electronic device 102 and the wireless audio input/output device 103 in some examples. However, the subject technology can also be applied to a single device, and/or to a wired or wireless a connection between the electronic device 102 and input/output devices.

Figure 2:
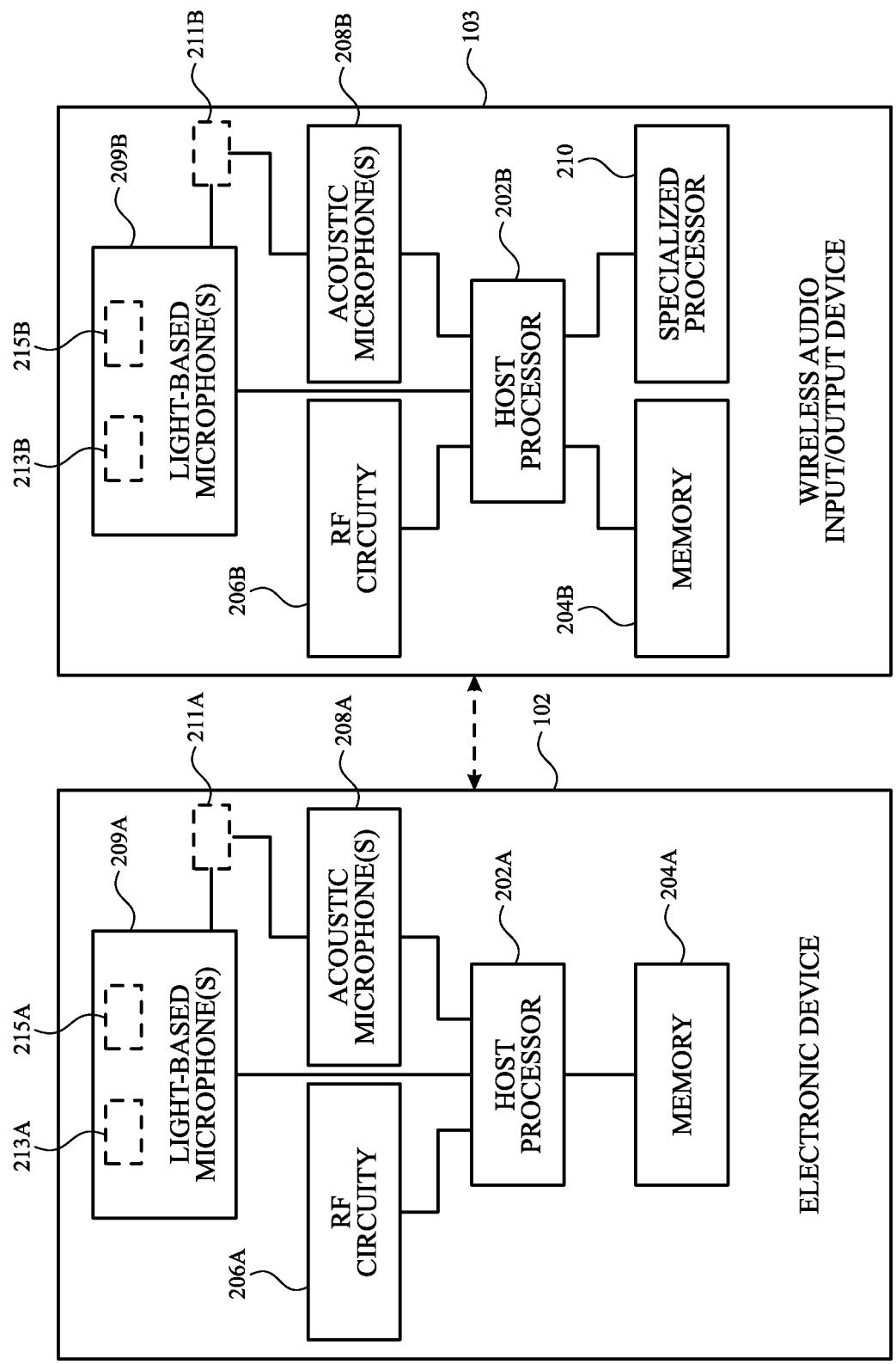
FIG. 2 illustrates an example network environment including an example electronic device and an example wireless audio input/output device in accordance with one or more implementations.

FIG. 2 illustrates an example network environment including an example electronic device and an example wireless audio input/output device in accordance with one or more implementations. The electronic device 102 is depicted in FIG. 2 for explanatory purposes; however, one or more of the components of the electronic device 102 may also be implemented by other electronic device(s) (e.g., one or more of the electronic device 104 and the electronic device 105 or another apparatus or system, such as a train car, an aircraft, a watercraft or the like). Similarly, the wireless audio input/output device 103 is depicted in FIG. 2 for explanatory purposes; however, one or more of the components of the wireless audio input/output device 103 may also be implemented by other device(s) (e.g., a headset and/or headphones). Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In the example of FIG. 2, the electronic device 102 includes a host processor 202A, a memory 204A, radio frequency (RF) circuitry 206A, one more acoustic microphone(s) 208A, and one or more light-based microphones 209A. As shown, the light-based microphone(s) 209A may include a light source 213A and a light sensor 215A. The light source 213A may emit or project light (e.g., visible light, infrared light, radio wavelength light, or other light) from the electronic device 102 onto one or more sound sources in the environment of the electronic device 102. Portions of the light from the light source 213A may be reflected by one or more of the sources of sound in the environment. Based on variations in the reflected portion of the light, the light sensor 215A (e.g., and/or the host processor 202A) can generate a microphone signal (also referred to herein as an optical microphone signal in some examples) that represents the sounds generated by the one or more sources of the sound. In accordance with aspects of the subject disclosure, the microphone signal generated by the light-based microphone(s) 209A (also referred to herein as vibration sensors or remote vibration sensors in some examples) can be jointly processed with microphone signals generated by the acoustic microphone(s) 208A.

As shown in FIG. 2, the wireless audio input/output device 103 may include one or more processors, such as a host processor 202B and/or a specialized processor 210. The wireless audio input/output device 103 may further include a memory 204B, RF circuitry 206B, one or more acoustic microphone(s) 208B, and/or one or more light-based microphones 209B. The light-based microphone(s) 209B may include a light source 213B and a light sensor 215B. The light source 213B may emit or project light (e.g., visible light, infrared light, radio wavelength light, or other light) from the wireless audio input/output device 103 onto one or more sound sources in the environment of the wireless audio input/output device 103. Portions of the light from the light source 213B may be reflected by one or more of the sources of sound in the environment. Based on variations in the reflected portion of the light, the light sensor 215B (e.g., and/or the specialized processor 210 and/or the host processor 202B) can generate a microphone signal (also referred to herein as an optical microphone signal in some examples) that represents the sounds generated by the one or more sources of the sound. In accordance with aspects of the subject disclosure, the microphone signal generated by the light-based microphone(s) 209B (also referred to herein as vibration sensors or remote vibration sensors in some examples) can be jointly processed with microphone signals generated by the acoustic microphone(s) 208B.

Although the example of FIG. 2 illustrates both the electronic device 102 and the wireless audio input/output device 103 as including both acoustic and light-based microphones, in some examples, the acoustic microphones may be disposed in one device and the light-based microphones may be disposed in another device (e.g., a physically separate device), and the acoustic microphone signals from the acoustic microphones and the optical microphone signals from the light-based microphones may be jointly processed at one of the devices and/or at a third device.

The RF circuitry 206A and/or the RF circuitry 206B may include one or more antennas and one or more transceivers for transmitting/receiving RF communications, such as WiFi, Bluetooth, cellular, and the like. In one or more implementations, the RF circuitry 206A of the electronic device 102 may include circuitry for forming wide area network connections and peer-to-peer connections, such as WiFi, Bluetooth, and/or cellular circuitry, while the RF circuitry 206B of the wireless audio input/output device 103 may include Bluetooth, WiFi, and/or other circuitry for forming peer-to-peer connections.

The host processor 202A and/or the host processor 202B may include suitable logic, circuitry, and/or code that enable processing data and/or controlling operations of the electronic device 102 and the wireless audio input/output device 103, respectively. In this regard, the host processor 202A and/or the host processor 202B may be enabled to provide control signals to various other components of the electronic device 102 and the wireless audio input/output device 103, respectively. Additionally, the host processor 202A and/or the host processor 202B may enable implementation of an operating system or may otherwise execute code to manage operations of the electronic device 102 and the wireless audio input/output device 103, respectively. The memory 204A and/or the memory 204B may include suitable logic, circuitry, and/or code that enable storage of various types of information such as received data, generated data, code, and/or configuration information. The memory 204A and/or the memory 204B may include, for example, random access memory (RAM), read-only memory (ROM), flash, and/or magnetic storage.

In one or more implementations, a given electronic device, such as the wireless audio input/output device 103, may include a specialized processor (e.g., the specialized processor 210) that may be always powered on and/or in an active mode, e.g., even when a host/application processor (e.g., the host processor 202B) of the device is in a low power mode or in an instance where such an electronic device does not include a host/application processor (e.g., a CPU and/or GPU). Such a specialized processor may be a low computing power processor that is engineered to utilize less energy than the CPU or GPU, and also is designed, in an example, to be running continuously on the electronic device in order to collect audio and/or sensor data. In an example, such a specialized processor can be an always on processor (AOP), which may be a small and/or low power auxiliary processor. In one or more implementations, the specialized processor 210 can be a digital signal processor (DSP).

The specialized processor 210 may be implemented as specialized, custom, and/or dedicated hardware, such as a low-power processor that may be always powered on (e.g., to collect and process audio signals provided by the acoustic microphone(s) 208B and/or the light-based microphones 209B), and may continuously run on the wireless audio input/output device 103. The specialized processor 210 may be utilized to perform certain operations in a more computationally and/or power efficient manner. In an example, the host processor 202A, the host processor 202B, and/or the specialized processor 210 may implement a system for joint processing of acoustic and optical microphone signals, as described herein. In one or more implementations, the wireless audio input/output device 103 may only include the specialized processor 210 (e.g., exclusive of the host processor 202B).

One or more of the acoustic microphone(s) 208A and/or the acoustic microphones 208B may be implemented as external microphones configured to receive sound from the environment external to the electronic device 102 and the wireless audio input/output device 103, internal microphones configured to receive sound from the environment internal to the electronic device 102 and the wireless audio input/output device 103, error microphones, or a combination of external microphone(s), error microphones, and/or internal microphone(s). In one or more implementations, the acoustic microphone(s) 208A may include multiple acoustic microphones that can be operated as a microphone array (e.g., for detection of sounds from various directions using beam steering). In one or more implementations, the acoustic microphone(s) 208B may include multiple acoustic microphones that can be operated as a microphone array (e.g., for detection of sounds from various directions using beam steering). As discussed further below with respect to FIGS. 3-8, one or more electronic devices, such as the electronic device 102 and/or the wireless audio input/output device 103 may be configured to implement a system for joint processing of signals from acoustic microphones (e.g., acoustic microphones 208A and/or acoustic microphone(s) 208B, having a movable diaphragm coupled to microphone circuitry that generates electrical signals in response to movement of the diaphragm) and light-based microphones (e.g., light-based microphone(s) 209A and/or light-based microphone(s) 209B having a light source and a light sensor) or other vibration sensors.

In one or more implementations, one or more aspects of the host processor 202A and/or the host processor 202B, the memory 204A and/or the memory 204B, the RF circuitry 206A and/or the RF circuitry 206B, the acoustic microphone(s) 208A and/or the acoustic microphones 208B, the light-based microphone(s) 209A and/or the light-based microphone(s) 209B, the steering mechanism 211A and/or the steering mechanism 211B, and/or the specialized processor 210 may be implemented in hardware (e.g., including an Application Specific Integrated Circuit (ASIC), a Field Programmable Gate Array (FPGA), a Programmable Logic Device (PLD), a controller, a state machine, gated logic, discrete hardware components, or any other suitable devices), implemented in software (e.g., subroutines and code), and/or a combination of both software and hardware.

Optionally, the acoustic microphone(s) and/or the light-based microphone(s) of the electronic device 102 and/or the wireless audio input/output device 103 may be steerable (e.g., mechanically and/or programmatically steerable). For example, in one or more implementations, the electronic device 102 may include a steering mechanism 211A (e.g., including a motor) coupled to the acoustic microphone(s) 208A and/or the light-based microphone(s) 209A and operable to steer the physical direction in which the microphones face. In the example of FIG. 2, the wireless audio input/output device 103 may also include a steering mechanism 211B (e.g., including a motor) coupled to the acoustic microphone(s) 208B and/or the light-based microphone(s) 209B and operable to steer the physical direction in which one or more of the microphones face. Additionally, or alternatively, the acoustic microphone(s) 208A, the acoustic microphone(s) 208B, the light-based microphone(s) 209A, and/or the light-based microphone(s) 209B may be implemented as microphone arrays that are programmatically steerable by applying beam forming processing to the microphone signals from the array.

Figure 3:
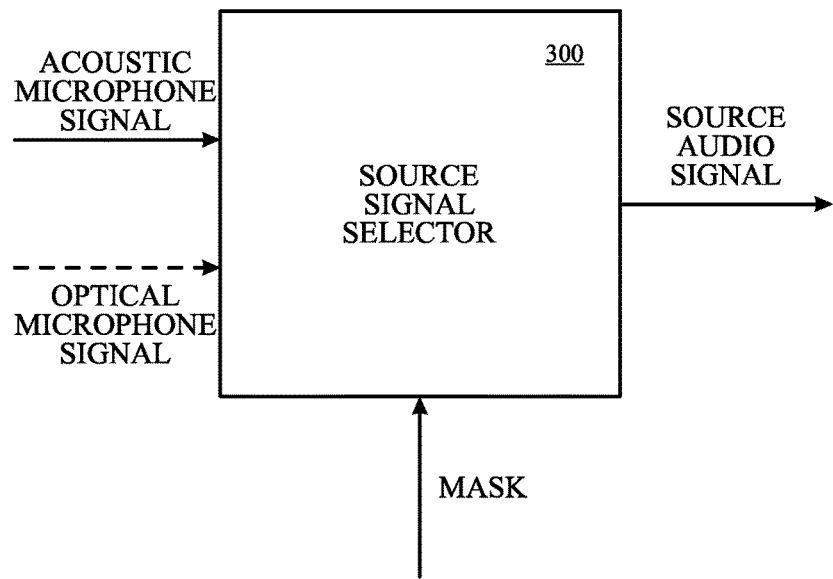
FIG. 3 illustrates a block diagram of an example architecture for joint processing of optical and acoustic microphone signals in accordance with one or more implementations.

FIG. 3 illustrates a block diagram of a source signal selector 300 for joint processing of microphone signals from acoustic microphones and from vibration sensors such as light-based microphones in accordance with one or more implementations. For example, the source signal selector 300 may be implemented by the electronic device 102, the wireless audio input/output device 103, and/or any other electronic device of FIG. 1. However, the source signal selector 300 is not limited to the electronic devices of FIG. 1, and may be implemented by one or more other components and other suitable devices, apparatus, or systems, such as a train car, an aircraft, a watercraft, a vehicle, or the like.

As shown, the source signal selector 300 may receive an acoustic microphone signal. The acoustic microphone signal may be representative of sounds from one or more sources in the environment of the electronic device 102. As examples, the sounds may include the voice of a user of the electronic device 102 (e.g., while the user is speaking to the electronic device 102 or speaking to another person or to themselves), the voice(s) of one or more other people in the vicinity of the electronic device 102, and/or other sounds such as ambient noise in the environment of the electronic device 102.

The acoustic microphone signal may be a microphone signal received directly from one or more acoustic microphones such as acoustic microphone(s) 208A of FIG. 2, or may be pre-processed (e.g., to combined microphone signals from multiple acoustic microphone(s) 208A and/or to filter or otherwise pre-process the microphone signals) prior to being provided to the source signal selector 300. In one or more implementations, the source signal selector 300 may divide the acoustic microphone signals into multiple frequency subbands (e.g., by dividing the acoustic microphone signals into time-frequency bins).

As shown, the source signal selector 300 may also receive a mask. The mask may be based, at least in part, on an optical microphone signal obtained by light-based microphone 209A or another vibration sensor that directly senses vibrations of the source of a sound. In one or more implementations, the mask may also be generated based, at least in part, on the acoustic microphone signal. Because a light-based microphone or other vibration sensor may have a high degree of directionality and thus be performant in the presence of ambient noise or other confounding sound sources, the mask generated based on the optical microphone signal from the light-based microphone or other vibration sensor may be helpful in distinguishing the portions of the acoustic microphone signal that correspond to sound from one or more particular (e.g., desired) sources, such as the voice of a user. The mask may indicate, for each of the subbands into which the source signal selector 300 divides the acoustic microphone signal, whether sound from a desired source (e.g., the voice of the user) is present.

As indicated in FIG. 3, the source signal selector 300 may select, using the mask, a source audio signal that is representative of a sound from a source (e.g., the desired source) from the input acoustic microphone signal. In this way, the sound from a source can be detected by the source signal selector 300. For example, the source audio signal may be a portion of the acoustic microphone signal that is representative of the sound from the source. In various implementations, the mask may be implemented as a binary mask that includes values, each corresponding to a frequency subband and each indicating whether that frequency subband is to be included in the output (e.g., source audio) signal, or may be implemented as a probability mask (e.g., an ideal ratio mask) that includes values, each corresponding to a frequency subband and each indicating the probability that the source is present in that frequency subband (e.g., and indicating an amount of the signal in that subband that is to be included in the output (e.g., source audio) signal.

In this way, the mask that is generated based (e.g., at least in part) on the optical microphone signal is used to inform the processing of the acoustic microphone signal. This can be useful for voice detection, trigger phrase detection, and/or generally for any audio source separation or detection applications. As indicated in FIG. 3, in one or more implementations the source signal selector 300 may also receive the optical microphone signal. In these implementations, the source signal selector 300 may include one or more portions (e.g., one or more subbands as indicated by the mask) of the optical microphone signal in the source audio signal. In various implementations, the source audio signal may be transmitted to another device, may be output by a speaker, may be used as an audio input to an electronic device (e.g., as an input to a virtual assistant application) or may be used in any other suitable manner.

Figure 4:
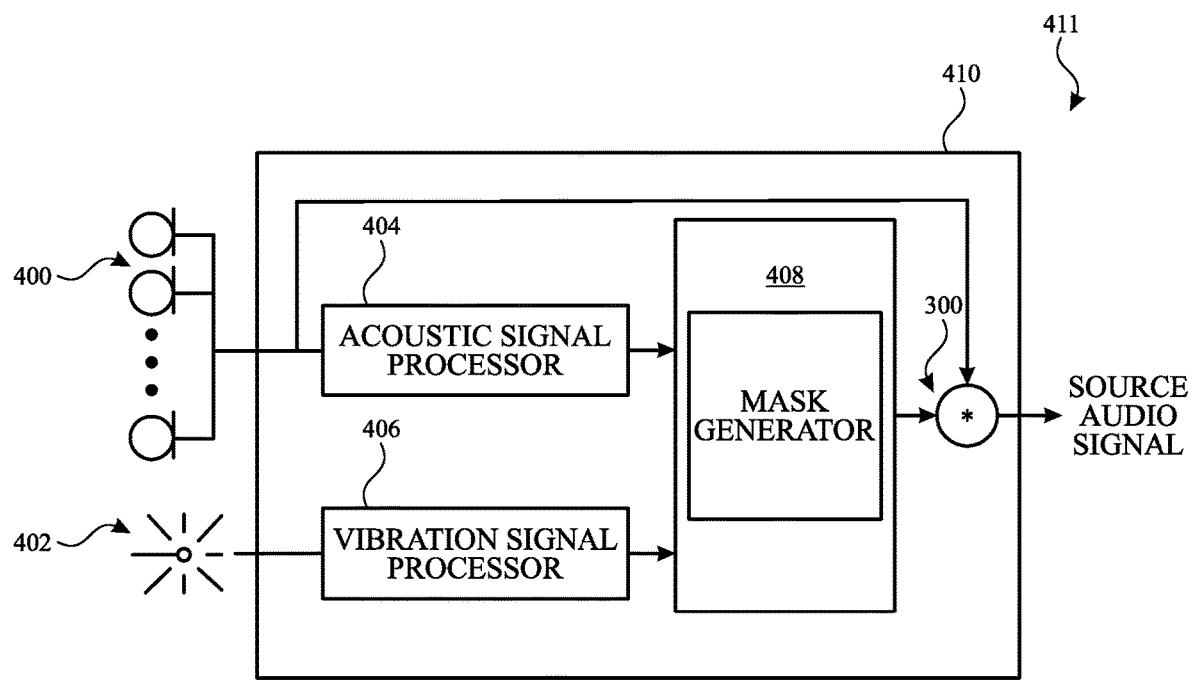
FIG. 4 illustrates a block diagram illustrating further details of the example architecture of FIG. 3 in accordance with one or more implementations.

FIG. 4 illustrates a block diagram of an example architecture 411 in which the source signal selector 300 may be implemented. For explanatory purposes, the architecture 411 may be implemented in the electronic device 102 or the wireless audio input/output device 103 of FIG. 1. However, the architecture 411 is not limited to the electronic device 102 or the wireless audio input/output device 103 of FIG. 1, and may be implemented by one or more other components and other suitable devices (e.g., one or more other electronic devices of FIG. 1 or any other suitable electronic device or another apparatus or system such as a train car, an aircraft, a watercraft or the like). Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In the example of FIG. 4, the architecture 411 includes an acoustic microphone array 400, a vibration sensor 402, and processing circuitry 410 that includes the source signal selector 300. For example, the acoustic microphone array 400 may include multiple acoustic microphones, such as the acoustic microphone(s) 208A of FIG. 2. As an example, the vibration sensor 402 may include a light-based microphone 209A, such as an optical microphone. The vibration sensor 402 may also, or alternatively, include an accelerometer, one or more cameras, and/or any other sensor capable of directly sensing vibrations of a sound source. For example, the vibration sensor 402 may be implemented as a light-based sensor which may include a high frame-rate depth sensor and a laser.

As indicated in FIG. 4, the processing circuitry 410 may include an acoustic signal processor 404 that processes the acoustic microphone signals from the acoustic microphone array 400 and a vibration signal processor 406 that processes vibration sensor signal(s) (e.g., optical microphone signals) from the vibration sensor 402. For example, the acoustic signal processor 404 may divide the acoustic microphone signal from the acoustic microphone array 400 into the frequency subbands and may generate a first set of probabilities for the frequency subbands (e.g., a first set of probabilities that each subband includes a source of interest). The vibration signal processor 406 may generate a second set of probabilities for some or all of the frequency subbands into which the acoustic microphone signals are divided (e.g., second set of probabilities that each of some or all of the subband includes a source of interest).

As illustrated in FIG. 4, the processing circuitry 410 may include a mask generator 408 that receives the first set of probabilities from the acoustic signal processor 404 and the second set of probabilities from the vibration signal processor 406. As shown, the mask generator 408 may combine the first and second sets of probabilities to generate the mask that is provided to the source signal selector 300 that also receives the acoustic microphone signal(s) from the acoustic microphone array 400. The mask generator 408 may combine the first and second sets of probabilities by averaging the first and second probabilities for each subband, multiplying the probabilities for each subband, obtaining the union of the probabilities for each subband, or otherwise probabilistically combining the first and second probabilities for each subband. In one or more implementations, the mask generator may be implemented as an ideal ratio mask estimator that combines the first and second sets of probabilities to obtain an ideal ratio mask (IRM). In one or more implementations, a neural network may be used to learn an optimal combination between the acoustic and optical probabilities. The source signal selector 300 then applies the mask received from the mask generator 408 to the acoustic microphone signal(s) to generate the source audio signal (e.g., as described herein in connection with FIG. 3).

Figure 5:
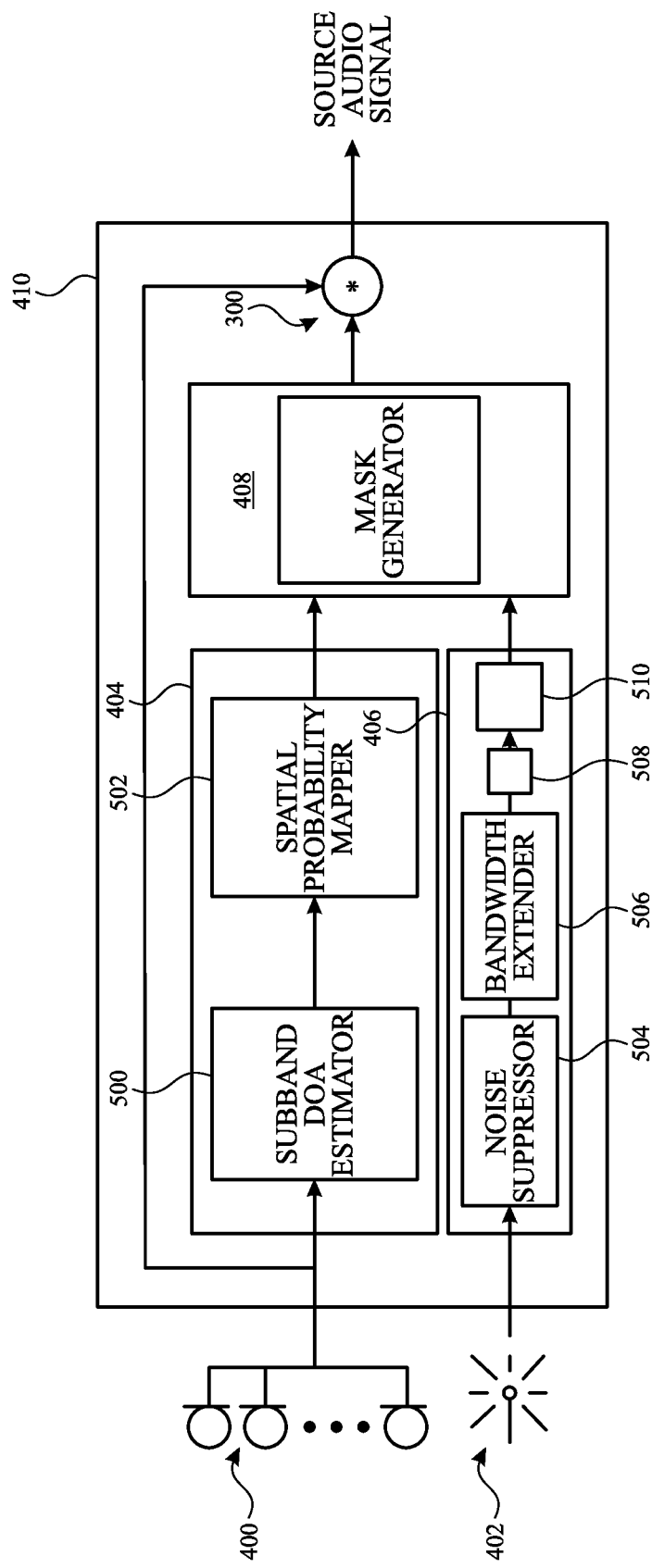
FIG. 5 illustrates a block diagram illustrating further details of the example architecture of FIG. 4 in accordance with one or more implementations.

FIG. 5 illustrates additional details that may be implemented in the architecture of FIG. 4, in accordance with one or more implementations. In one or more implementations, one or more aspects of the architecture of FIG. 5 may be implemented in hardware (e.g., including an Application Specific Integrated Circuit (ASIC), a Field Programmable Gate Array (FPGA), a Programmable Logic Device (PLD), a controller, a state machine, gated logic, discrete hardware components, or any other suitable devices), implemented in software (e.g., subroutines and code), and/or a combination of both software and hardware. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In the example of FIG. 5, the acoustic signal processor 404 includes a subband direction of arrival (DoA) estimator 500 and a spatial probability mapper 502. For example, subband DoA estimator 500 may divide the acoustic microphone signal from the acoustic microphone array 400 into multiple subbands, for example, where each subband corresponds to a predefined frequency range. The subband DoA estimator 500 may estimate the location of the dominant sound signal in each subband, using a subband localization technique. In one or more implementations, the subband DoA estimator 500 may also use multi-source techniques to estimate the directions of multiple sound waves for each subband. For example, for each subband and frame of the acoustic microphone signal, the subband DoA estimator 500 may determine one or more directions of arrival (DOAs) and/or one or more steering vectors (SVs), in order to estimate a location of one or more sound sources (e.g., including a dominant sound source corresponding to the dominant audio) in that subband. In one or more implementations, the DOA may be estimated using multiple acoustic microphones of the acoustic microphone array 400.

The DoA estimator 500 may determine the direction and/or location of the dominant sound signal in each subband of the acoustic microphone signals and may output DoA and/or SV estimates, which are in turn provided as input to the spatial probability mapper 502.

The spatial probability mapper 502 may calculate the probability, for each subband, that the dominant audio (e.g., at a time/subband) includes sound from a source of interest (e.g., a source in a particular direction). As an example, the spatial probability mapper 502 may convert DoA estimates from the subband DoA estimator 500 onto spatial probabilities using a spherical distribution. For example, the spatial probability mapper 502 may convert directions into attenuation gains based on a desired spatial pattern or "look direction" for the acoustic microphone array 400 (e.g., to preserve energy from a first direction, such as a forward direction in front of the microphone array, and to reject energy from a second direction, such as a rearward direction behind the microphone array).

For example, in one or more implementations, for each time-frequency bin (e.g., in each subband at each time frame such as each millisecond), the spatial probability mapper 502 may set a relatively high probability if the DoA for that time-frequency bin is in a direction of a source of interest, and a relatively low probability if the DoA for that time-frequency bin is away from the direction of the source of interest. It is appreciated that, although an electronic device 102 may not know a priori that a sound source is actually at the location that the spatial probability mapper 502 considers to be the location of a source of interest, the direction of the source of interest that is used by the spatial probability mapper 502 to set the sound source probabilities may be an expected location of a sound source relative to the electronic device, relative to the acoustic microphone array 400 and/or relative to the vibration sensor 402 (e.g., relative to, such as the same as, the direction of a laser beam of an optical microphone). For example, an electronic device or other apparatus or system may be configured such that a laser beam of an optical microphone is directed at a location at which a user of the electronic device is expected to be located during at least some times during operation of the electronic device or other apparatus or system, and the spatial probability mapper can set high probabilities for subbands with DoAs in the same direction in which the laser beam of the optical microphone is directed, in one or more implementations. In one or more implementations, weights may be assigned to one or more acoustic probabilities from the acoustic signal processor 404 and/or one or more optical probabilities from the vibration signal processor 406 based on information such as a measurement of an amount of optical noise present in the light-based microphone(s), a-priori knowledge of acoustic conditions, etc.

In the example of FIG. 5, the vibration signal processor 406 includes a noise suppressor 504, a bandwidth extender 506, an aligner 508, and a source presence estimator 510. For example, the noise suppressor 504 may be a stationary noise suppressor. For example, the vibration signal from the vibration sensor 402 may be contaminated with stationary noise, which is removed by the noise suppressor 504. In various implementations, the noise suppressor 504 may suppress noise in the vibration signal using static and/or adaptive filters and/or using a machine learning model trained to generate a noise-suppressed output signal from a noisy input vibration signal (e.g., optical microphone signal).

In one or more implementations, the acoustic microphones of the microphone array may be sensitive to sounds over a wider range of frequencies than the vibration sensor 402 (e.g., due to constraints on the frame rate of the light sensor that senses the reflected portions of the light projected on the source of the sound). In one or more implementations, a bandwidth extender 506 may optionally be provided to expand the sensed vibration signal from the vibration sensor to additional frequencies (e.g., additional subbands in which the acoustic microphones sense vibrations). For example, the bandwidth extender 506 may include a pre-trained machine learning model (e.g., a pre-trained deep neural network) trained to estimate vibration signals at various frequencies (e.g., subbands) from measured vibration signals at other frequencies (e.g., subbands). In other implementations, the bandwidth extender 506 may extrapolate and/or interpolate the measured vibration signals to obtain estimates of the vibration signals at other frequencies. In yet other implementations, the processing circuitry 410 may be provided without a bandwidth extender (e.g., and the mask generator 408 may use probabilities based on the vibration sensor only in the subbands for which the vibration sensor provides measurements).

As discussed herein, the acoustic microphones of the acoustic microphone array 400 and the vibration sensor 402 may sense the same sound(s) from the same source(s), using different modalities. This can cause the signals generated by the acoustic microphone array 400 and the vibration sensor 402 to be generated at different times, even when those signals are generated by the same sound. For example, the acoustic microphones generate acoustic microphone signals responsive to sound waves that travel through the air, at the speed of sound, from the source of the sound to the acoustic microphone(s). In contrast, in one or more implementations, the vibration sensor may be an accelerometer that is in direct contact with the source of the sound and receives vibrations that indicate the sound by direct contact. In other implementations, the vibration sensor may be light-based microphone (e.g., a remote vibration sensor) that receives a signal indicating the sound, from the source of the sound, at the speed of light. In these examples, the vibration signal (e.g., the optical microphone signal) may be received by the processing circuitry 410 earlier than the acoustic microphone signals are received at the processing circuitry 410. The aligner 508 may adjust the timing of the vibration signal (e.g., and/or the acoustic microphone signal) to align the vibration signal and the acoustic microphone signal in time. For example, the aligner 508 may align the vibration signal and the acoustic microphone signal to account for a difference between the speed of light (e.g., light speed) and the speed of sound (e.g., sound speed) in the air in the environment of the electronic device 102.

In one or more implementations, the aligner may align the vibration signal and the acoustic microphone signal using the signals themselves (e.g., by performing a cross-correlation, such as a filter-bank-based cross correlation, of the vibration signal and the acoustic microphone signal to identify correlated features in the two signals and aligning the correlated features). In one or more other implementations, the aligner 508 may align the vibration signal and the acoustic microphone signal based on the difference between the speed of light and the speed of sound, using a known (e.g., measured) or estimated distance to the source of the sound. In one or more implementations, the distance to the source of the sound may be measured using the vibration sensor 402 itself. For example, in an implementation in which the vibration sensor is implemented with a light source and a light sensor, time-of-flight measurements for the emitted light from the light source to be reflected and received by the light sensor can be used to measure the distance to the source, given the known speed of light. In one or more other implementations, other measured and/or a priori knowledge of the (e.g., approximate or exact) location of the source of the sound may be used.

Then, also knowing the speed of sound and the distance to the source, the relative delay in receiving the acoustic microphone signal relative to the receipt of the vibration sensor signal can be determined. This delay can be applied to delay the vibration signal to align the vibration signal and the acoustic microphone signal in time.

In one or more implementations, other device sensors and/or components may be used to measure or estimate the distance to the source of the sound. As examples, a speaker may be used to emit a sound and receive reflected portions of the emitted sound at different times with different microphones of the array to estimate a location of the source, a separate depth sensor (e.g., a LIDAR sensor) may be provided (e.g., in the electronic device 102) for measuring distances to objects, and/or two or more cameras may be used to triangulate the distance to the source of a sound. As discussed herein, once the distance to the source is known or estimated, the distance to the source, the speed of light, and the speed of sound can be used to measure a time offset that can be applied to align the vibration signal and the acoustic microphone signal in time. In one or more implementations, a device such as the electronic device 102 may also be provided with a temperature sensor with which the ambient temperature of the air in the environment around the electronic device 102 can be measured. The ambient temperature can be used to determine the current speed of sound in the environment around the electronic device more accurately.

In one or more implementations, the source presence estimator 510 may convert a vibration signal (e.g., the vibration signal generated from by the vibration sensor 402 and/or processed by the noise suppressor 504, the bandwidth extender 506, and/or the aligner 508) into (e.g., normalized) subband source presence probabilities. For example, the source presence estimator 510 may apply a statistical source model to the time-aligned vibration signal (e.g., a time-aligned optical microphone signal) to determine, for each subband for which the time-aligned vibration signal includes information, a probability that sound from a source of interest (e.g., speech from a user of the device, or any other sound from any other source from which the vibration sensor 402 receives vibration information, such as a source at which a laser or other light source of a light-based microphone is directed) is present in that subband. For example, the source presence probabilities may be relatively low or zero for subbands in which a signal is not detected by the vibration sensor 402, and relatively high or one for subbands in which a signal is detected by the vibration sensor 402. Because the vibration sensor 402 may be a highly directional sound detector (e.g., that detects vibrations from a source with which the vibration detector is in contact or at which a light source, such as a laser, is directed), the processing of the vibration sensor signal may assume that a detected vibration signal is a signal from the source of interest, in one or more implementations. Although the noise suppressor 504, the bandwidth extender 506, the aligner 508, and the source presence estimator 510 are depicted in FIG. 5 as separate processing blocks, in other implementations, two or more of the noise suppressor 504, the bandwidth extender 506, the aligner 508, and the source presence estimator 510 can be implemented in a single processing block, or the source presence estimator 510 can be implemented as an end-to-end (e.g., DNN) estimator which is trained to directly receive the vibration signal (e.g., the optical microphone signal) and output a source presence probability for each subband.

In one or more implementations, the mask generator 408 receives the first set of probabilities for each subband from the spatial probability mapper 502 and the second set of probabilities for each subband from the source presence estimator 510, and combines the first and second sets of probabilities to generate the mask to be applied to the acoustic microphone signal(s) (e.g., and/or the vibration signal or optical microphone signal) to generate the source audio signal. For example, the acoustic microphone array 400 may produce an erroneously high probability of a source presence in some subbands due to sound energy from another source coming from the look direction of the acoustic microphone array 400, whereas the vibration sensor 402 may produce erroneously high probabilities in other subbands due poor SNR, surface vibration distortions from external sources, and/or partial occlusion of the source of interest. The mask generator 408 may receive the source presence probabilities from the acoustic microphone array 400 and source presence probabilities from the vibration sensor 402 and combine the probabilities for each subband using probability logic to minimize the overall estimation errors (e.g., using two observations of the same event). The mask generator 408 may combine the first and second sets of probabilities using a rule-based or learning-based operation.

As discussed above in connection with FIGS. 3 and 4, once the mask is generated by the mask generator 408, the source signal selector 300 applies the mask to the input acoustic signals from the acoustic microphones (e.g., and/or the vibration signal or optical microphone signal), to generate the source audio signal containing (e.g., only) the signal representing the sound from the source of interest.

In one or more implementations, the architecture of FIG. 4 may provide a system that contains both optical and acoustical microphones for the purpose of source separation, speech detection or other sound detection, and/or speech enhancement and associated processing operations (e.g., including telephony, voice inputs, or the like). In one or more implementations, the architecture of FIG. 4 may provide for estimating a speech presence probability from optical sensor data. In one or more implementations, the architecture of FIG. 4 may provide for aligning optical and acoustical signals on a frame level such that they can be jointly used for estimation of subband speech presence. In one or more implementations, the architecture of FIG. 4 may provide for combining speech presence probabilities from multi-modal observations, by applying frequency-dependent probability statistics.

In one or more implementations, the source presence probabilities generated based on the acoustic microphone signals and the source presence probabilities generated based on the vibration signals can be so discrepant as to indicate that the acoustic microphone(s) and the vibration sensor are receiving sound/vibrations from two different sources. This can occur if, for example, beam steering for the acoustic microphone array 400 is directed in a different direction from which a light source (e.g., a laser source) of an optical microphone is directed. This can occur, for example, due to the positioning of the source relative to a microphone array and a light source that are spaced widely apart in the same device or due to a microphone array in a first device being oriented differently from an optical microphone in a second (e.g., different) device. In one or more implementations, when such a discrepancy is detected (e.g., by the mask generator 408), the microphone array can be steered using beam steering to the direction in which the optical microphone is directed, and/or one or both of the microphone array and the optical microphone can be physically steered (e.g., using a steering mechanism, such as the steering mechanism 211A or the steering mechanism 211B of FIG. 2) until the microphone array and the optical microphone are in alignment (e.g., until the discrepancy between the source presence probabilities generated based on the acoustic microphone signals and the source presence probabilities generated based on the vibration signals meets a predetermined value or range of values (e.g., is reduced below a threshold or to within an acceptable range).

Figure 6:
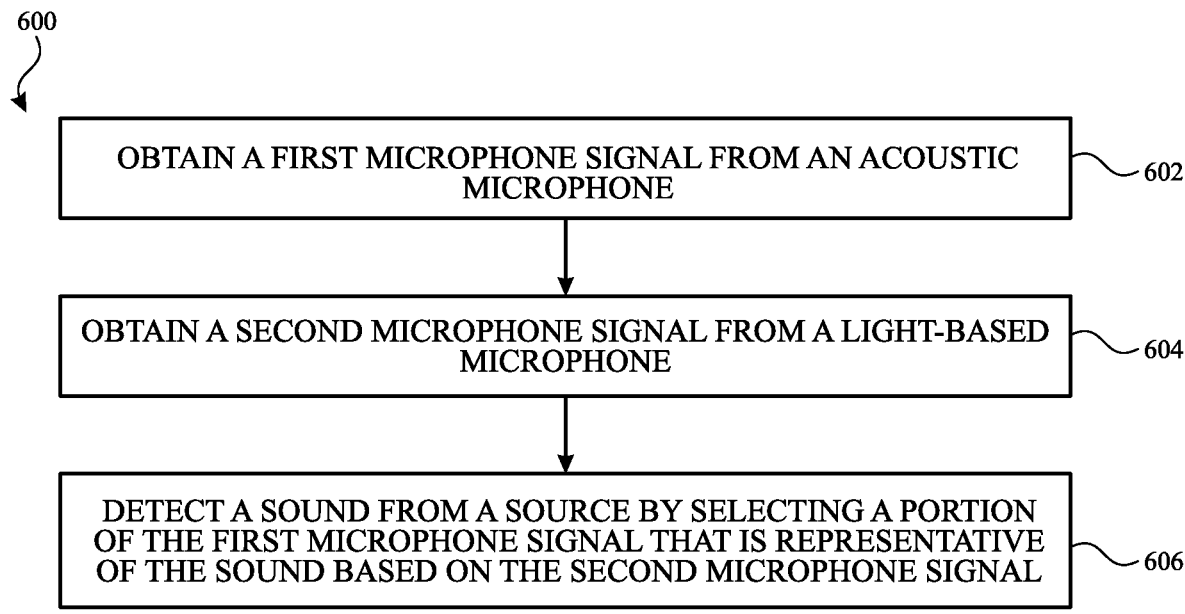
FIG. 6 illustrates a flow diagram of example process for joint processing of optical and acoustic microphone signals, in an audio signal in accordance with one or more implementations.

FIG. 6 illustrates a flow diagram of example process for joint processing of acoustic and optical microphone signals in accordance with one or more implementations. For explanatory purposes, the process 600 is primarily described herein with reference to the electronic device 102 of FIG. 1. However, the process 600 is not limited to the electronic device 102 of FIG. 1, and one or more blocks (or operations) of the process 600 may be performed by one or more other components and other suitable devices or systems (e.g., the wireless audio input/output device 103, another electronic device of FIG. 1, or any other suitable electronic device or apparatus with one or more acoustic microphones and one or more vibration sensors, such as optical microphones— including apparatus which may include an aircraft, a vehicle, a train car, a watercraft, or another mobile or stationary installation with one or more acoustic microphones and one or more vibration sensors, such as optical microphones). Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

At block 602, an electronic device (e.g., electronic device 102) or other system or apparatus as described herein may obtain a first microphone signal (e.g., an acoustic microphone signal) from an acoustic microphone (e.g., an acoustic microphone 208A, such as an acoustic microphone of an acoustic microphone array 400). The first microphone signal may be received directly from the acoustic microphone or may be pre-processed (e.g., amplified, filtered, etc.) after being generated by the acoustic microphone. The first microphone signal may be obtained by the device, system, or apparatus in which the acoustic microphone is implemented, or may be received from an acoustic microphone of another device, system, or apparatus.

At block 604, the electronic device or other system or apparatus may obtain a second microphone signal (e.g., a vibration signal or an optical microphone signal) from a light-based microphone (e.g., light-based microphone 209A or vibration sensor 402). For example, obtaining the second microphone signal may include projecting light from a light source (e.g., a light source 213A, such as a laser light source) of the light-based microphone onto the source of the sound and detecting vibrations of the source of the sound based on a reflected portion of the projected light that is received at a light sensor (e.g., light sensor 215A) of the light-based microphone. For example, the light source may include a laser configured to project the light, and the light sensor may include a depth sensor configured to receive the reflected portion of the projected light in one or more implementations. In various implementations, the acoustic microphone and the light-based microphone may be implemented in the same device, system or apparatus, or may be implemented in separate devices, systems, or apparatus.

In one or more implementations, the process 600 may also include aligning (e.g., by aligner 508) the first microphone signal and the second microphone signal, in time, to account for a difference between a time for the reflected portion of the light to travel from the source of the sound to the light sensor and a time for the sound to travel from the source of the sound to the acoustic microphone.

At block 606, the electronic device or other system or apparatus (e.g., a source signal such as source signal selector 300 of FIG. 3) may detect a sound from a source by selecting a portion of the first microphone signal that is representative of the sound based on the second microphone signal. For example, the portion of the first microphone signal may include one or more subbands of the first microphone signal, selected using a mask generated, in part, based on the second microphone signal.

In one or more implementations, the first microphone signal is an acoustic microphone signal, and the process 600 also includes obtaining at least one additional acoustic microphone signal from at least one additional acoustic microphone of an acoustic microphone array (e.g., acoustic microphone array 400) that includes the acoustic microphone. In one or more implementations, selecting the portion of the first microphone signal includes determining (e.g., by a source presence estimator such as source presence estimator 510) a plurality of acoustic subband probabilities using the acoustic microphone signal and the at least one additional acoustic microphone signal. For example, each of the acoustic subband probabilities may correspond to a subband of the acoustic microphone signal (e.g., to a time-frequency bin of the acoustic microphone signal). In one or more implementations, selecting the portion of the first microphone signal also includes determining (e.g., by a spatial probability estimator such as spatial probability mapper 502) a plurality of optical subband probabilities using the second microphone signal. For example, each of the optical subband probabilities may correspond to one of the subbands to which the acoustic subband probabilities correspond.

In one or more implementations, selecting the portion of the first microphone signal at block 606 also includes generating (e.g., by a mask generator such as mask generator 408) an acoustic mask using the plurality of acoustic subband probabilities and the plurality of optical subband probabilities, and applying (e.g., by the source signal selector 300) the acoustic mask to at least the acoustic microphone signal to select the portion of the first microphone signal. For example, the mask may include values, each corresponding to a subband of the first microphone signal, that determine whether (e.g., for a binary value mask) and/or how much of (e.g., for a probability mask having mask values ranging from zero to one) the first microphone signal in that subband is to be included in an output source audio signal.

Figure 7:
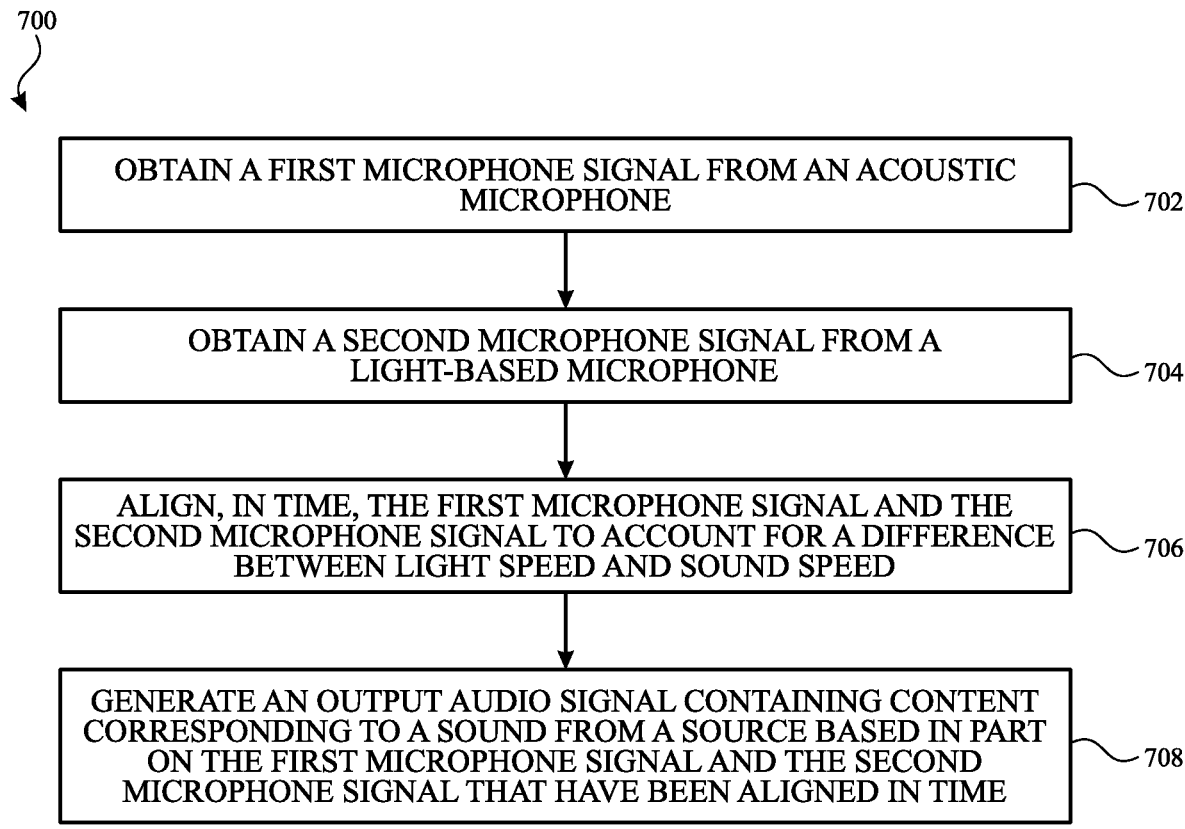
FIG. 7 illustrates a flow diagram of another example process for joint processing of optical and acoustic microphone signals, in an audio signal in accordance with one or more implementations.

FIG. 7 illustrates a flow diagram of another example process for joint processing of acoustic and optical microphone signals in accordance with one or more implementations. For explanatory purposes, the process 700 is primarily described herein with reference to the electronic device 102 of FIG. 1. However, the process 700 is not limited to the electronic device 102 of FIG. 1, and one or more blocks (or operations) of the process 700 may be performed by one or more other components and other suitable devices (e.g., the wireless audio input/output device 103, another electronic device of FIG. 1, or any other suitable electronic device or apparatus with one or more acoustic microphones and one or more vibration sensors, such as optical microphones—including apparatus which may include an aircraft, a vehicle, a train car, a watercraft, or another mobile or stationary installation with one or more acoustic microphones and one or more vibration sensors, such as optical microphones). Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

At block 702, an electronic device (e.g., electronic device 102) or other system or apparatus may obtain a first microphone signal (e.g., an acoustic microphone signal) from an acoustic microphone (e.g., an acoustic microphone 208A, such as an acoustic microphone of an acoustic microphone array 400). The first microphone signal may be an acoustic microphone signal. The electronic device may also obtain one or more additional (e.g., concurrent) acoustic microphone signals from one or more additional acoustic microphones. The first microphone signal may be received directly from the acoustic microphone or may be pre-processed (e.g., amplified, filtered, etc.) after being generated by the acoustic microphone. The first microphone signal may be obtained by the device, system, or apparatus in which the acoustic microphone is implemented, or may be received from an acoustic microphone of another device, system, or apparatus.

At block 704, the electronic device or other system or apparatus may obtain a second microphone signal (e.g., a vibration signal or an optical microphone signal) from a light-based microphone (e.g., a light-based microphone 209A or a vibration sensor 402). For example, obtaining the second microphone signal may include projecting light from a light source (e.g., a light source 213A, such as a laser light source) of the light-based microphone onto the source of the sound and detecting vibrations of the source of the sound based on a reflected portion of the projected light that is received at a light sensor (e.g., light sensor 215A) of the light-based microphone. For example, the light source may include a laser configured to project the light, and the light sensor may include a depth sensor configured to receive the reflected portion of the projected light in one or more implementations. In one or more implementations, the light-based microphone may include a vibration sensor, a depth sensor, or a high frame rate image sensor. In various implementations, the acoustic microphone and the light-based microphone may be implemented in the same device, system or apparatus, or may be implemented in separate devices, systems, or apparatus.

At block 706, the electronic device or other system or apparatus may align, in time, the first microphone signal and the second microphone signal to account for a difference between light speed and sound speed. For example, aligning the first microphone signal and the second microphone signal may include determining (e.g., by an aligner 508, as described here in connection with FIGS. 4 and 5) a delay time for the second microphone signal based on a cross-correlation of the first microphone signal and the second microphone signal, and applying (e.g., by the aligner 508) the delay time to the second microphone signal to align the first microphone signal and the second microphone signal. As another example, aligning the first microphone signal and the second microphone signal may include determining a distance to the source of the sound, determining (e.g., by an aligner 508, as described here in connection with FIGS. 4 and 5) a delay time for the second microphone signal based on the distance, the light speed, and sound speed, and applying (e.g., by the aligner 508) the delay time to the second microphone signal to align the first microphone signal and the second microphone signal.

At block 708, the electronic device or other system or apparatus may generate an output audio signal (e.g., a source audio signal as described herein) containing content corresponding to a sound from a source, based in part on the first microphone signal and the second microphone signal that have been aligned in time. In one or more implementations, the process 700 may also include, after the aligning at block 706, generating (e.g., by the acoustic signal processor 404) a first plurality of source presence probabilities based on the first microphone signal, generating (e.g., by the acoustic signal processor 404) a second plurality of source presence probabilities based on the second microphone signal, and combining (e.g., by the mask generator 408) the first plurality of source presence probabilities and the second plurality of source presence probabilities to generate a mask. In one or more implementations, generating the output audio signal containing the content corresponding to the sound from the source at block 708 includes applying (e.g., by the source signal selector 300) the mask to the first microphone signal. In one or more implementations, the mask may also be applied to one or more additional acoustic microphone signals, and/or to the second microphone signal (e.g., the optical microphone signal).

Figure 8:
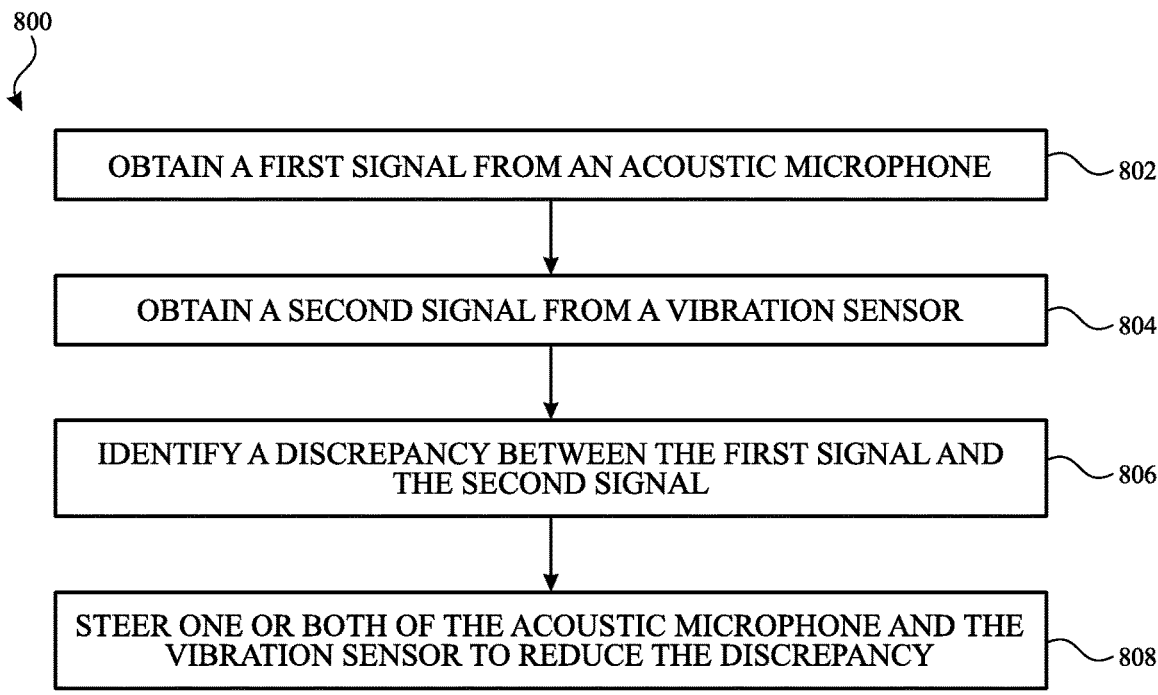
FIG. 8 illustrates a flow diagram of another example process for joint processing of optical and acoustic microphone signals, in an audio signal in accordance with one or more implementations.

FIG. 8 illustrates a flow diagram of an example process for joint processing of acoustic microphone signals and vibration signals in accordance with one or more implementations. For explanatory purposes, the process 800 is primarily described herein with reference to the electronic device 102 of FIG. 1. However, the process 800 is not limited to the electronic device 102 of FIG. 1, and one or more blocks (or operations) of the process 800 may be performed by one or more other components and other suitable devices (e.g., the wireless audio input/output device 103, another electronic device of FIG. 1, or any other suitable electronic device, system, or apparatus with one or more acoustic microphones and one or more vibration sensors, such as optical microphones—including apparatus which may include an aircraft, a vehicle, a train car, a watercraft, or another mobile or stationary installation with one or more acoustic microphones and one or more vibration sensors, such as optical microphones). Further for explanatory purposes, the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations.

At block 802, a system (e.g., a system including an electronic device such as electronic device 102, one or more other electronic devices, and/or one or more other devices or apparatus such as a train car, an aircraft, a watercraft, a vehicle, or the like) may obtain a first signal from an acoustic microphone (e.g., an acoustic microphone of system, such as an acoustic microphone 208A and/or an acoustic microphone of an acoustic microphone array 400 implemented in the system). The first signal may be an acoustic microphone signal. The system may also obtain one or more additional (e.g., concurrent) acoustic microphone signals from one or more additional acoustic microphones. For example, the one or more additional acoustic microphones may by microphone of a microphone array in which the acoustic microphone is implemented.

At block 804, the system may obtain a second signal (e.g., a vibration signal or an optical microphone signal) from a vibration sensor (e.g., vibration sensor 402). In one or more implementations, the vibration sensor is implemented as a remote vibration sensor that includes a light source (e.g., a light source 213A) configured to project a light onto a source of a sound, and a light sensor (e.g., a light sensor 215A) configured to generate the second signal responsive to a portion of the light reflected from the source of the sound and received by the light sensor.

In one or more implementations, the acoustic microphone is an acoustic microphone of a first electronic device (e.g., one of the electronic device 102 or the wireless audio input/output device 103), and the vibration sensor includes a vibration sensor of a second electronic device (e.g., the other of the electronic device 102 or the wireless audio input/output device 103). In one or more other implementations, the acoustic microphone and the vibration sensor are implemented in a single device or a single apparatus (e.g., the electronic device 102, the electronic device 104, the electronic device 105, the wireless audio input/output device 103, another electronic device, or another device or apparatus, such as a vehicle, a train car, an aircraft, a watercraft or the like).

At block 806, the system may identify a discrepancy between the first signal and the second signal. For example, identifying the discrepancy may include obtaining a first source separation result (e.g., a first set of probabilities from the spatial probability mapper 502) based on the first signal, obtaining a second source separation result (e.g., a second set of probabilities from the source presence estimator 510) based on the second signal, and determining that a variance between the first source separation result and the second source separation result contravenes (e.g., exceeds) a variance threshold. For example, in one or more use cases, the discrepancy between the first source separation result and the second source separation result may indicate that the acoustic microphone and the vibration sensor are receiving signals from two different sources of sound.

At block 808, the system may steer one or both of the acoustic microphone and the vibration sensor to reduce the discrepancy. For example, the system may monitor the discrepancy between the first signal and the second signal while steering one or both of the acoustic microphone and the vibration sensor to reduce the discrepancy, and may stop steering the one or both of the acoustic microphone and the vibration sensor when the discrepancy meets a predetermined value or range of values.

In one or more implementations, the vibration sensor includes a mechanically steerable vibration sensor, and steering one or both of the acoustic microphone and the vibration sensor at block 808 includes mechanically steering the vibration sensor to reduce the discrepancy. In one or more implementations, the acoustic microphone is one of a plurality of acoustic microphones in a microphone array (e.g., acoustic microphone array 400), and steering one or both of the acoustic microphone and the vibration sensor at block 808 also, or alternatively, includes performing a beam steering operation using a plurality of acoustic microphone signals each corresponding to a respective one of the plurality of acoustic microphones in the microphone array, to reduce the discrepancy.

In one or more use cases, variances in the sets of probabilities generated based on the signal from the acoustic microphone or the vibration sensor may also be discrepant from one another. For example, in a case in which a line-of-sight from an optical microphone to a source of sound that is also being detected by one or more acoustic microphones is blocked, the variance of the probabilities generated based on the optical microphone signal (e.g., and/or the variance of the optical microphone signal itself) may be significantly higher than the variances of the probabilities generated based on the acoustic microphone signal(s) (e.g., and/or the variance of the acoustic microphone signal itself). This may indicate a failure mode of the optical microphone and may cause the processing of microphone signals by the processing circuitry 410 of FIG. 4 and/or 5 to revert to using only the acoustic microphone signals to generate the mask. Similarly, if the variance of the acoustic microphone signal and/or the variances of the probabilities generated based on the acoustic microphone signal(s) are significantly higher than the variance of the optical microphone signal and/or the variances of the probabilities generated based on the optical microphone signal(s), this may indicate a failure mode of the acoustic microphone(s), and may cause the processing of microphone signals by the processing circuitry 410 of FIG. 4 and/or 5 to revert to using only the optical microphone signals to generate the output signal. In this way, a system, apparatus, or electronic device, such as electronic device 102, may test the reliability of the probabilities generated by the two microphone modalities by looking at the variances (e.g., comparing optical variances and the acoustic variances). If one of these variances is much higher than the other (e.g., by more than a threshold variance difference), the electronic device may determine that the two microphone modalities are not receiving sound from the same source, or that one is corrupted, and the system, apparatus, or electronic device may choose to rely on the microphone signal with the lower variance to generate a source audio signal for a source of interest.

As described above, one aspect of the present technology is the gathering and use of data available from specific and legitimate sources for joint processing of acoustic microphone signals and optical microphone signals. The present disclosure contemplates that in some instances, this gathered data may include personal information data that uniquely identifies or can be used to identify a specific person. Such personal information data can include voice data, demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for joint processing of acoustic microphone signals and optical microphone signals. Accordingly, use of such personal information data may facilitate transactions (e.g., on-line transactions). Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of joint processing of acoustic microphone signals and optical microphone signals, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 9:
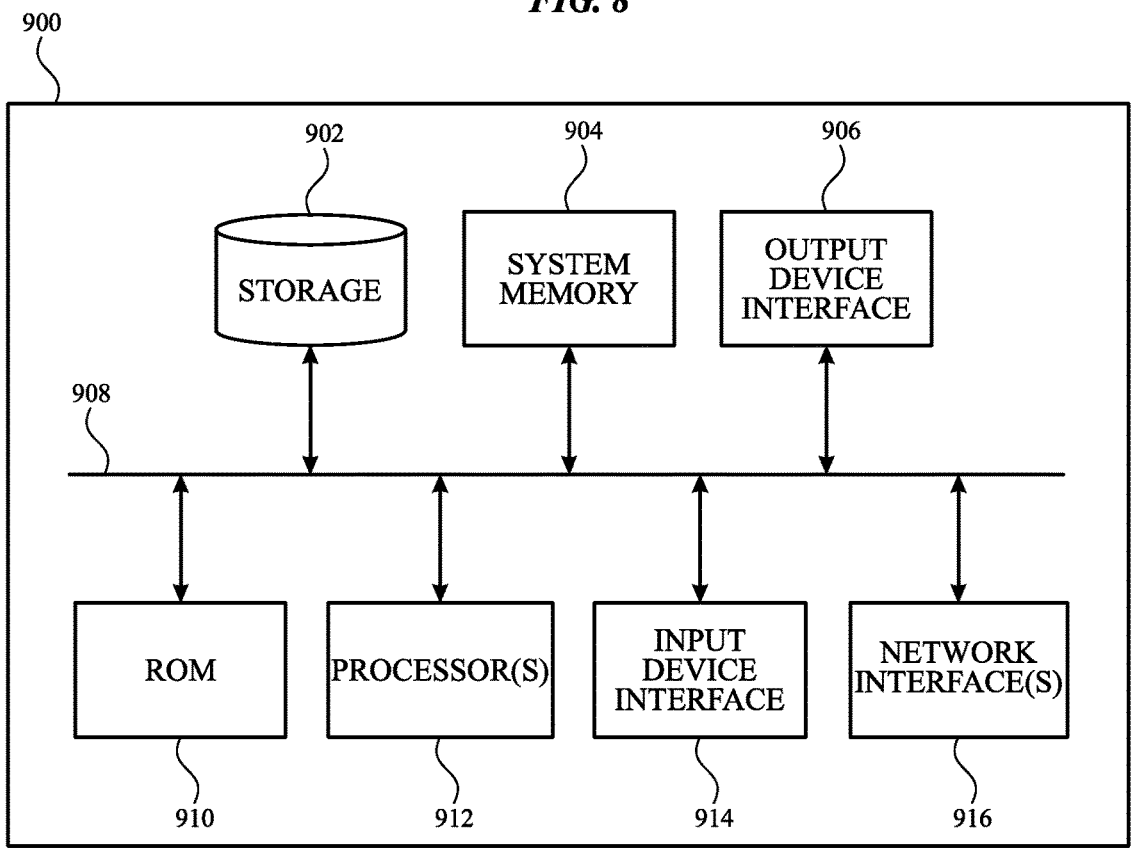
FIG. 9 illustrates an example electronic system with which aspects of the subject technology may be implemented in accordance with one or more implementations.

FIG. 9 illustrates an electronic system 900 with which one or more implementations of the subject technology may be implemented. The electronic system 900 can be, and/or can be a part of, one or more of the devices 102-105, and/or the server 108 shown in FIG. 1. The electronic system 900 may include various types of computer readable media and interfaces for various other types of computer readable media. The electronic system 900 includes a bus 908, one or more processing unit(s) 912, a system memory 904 (and/or buffer), a ROM 910, a permanent storage device 902, an input device interface 914, an output device interface 906, and one or more network interfaces 916, or subsets and variations thereof.

The bus 908 collectively represents all system, peripheral, and chipset buses that communicatively connect the numerous internal devices of the electronic system 900. In one or more implementations, the bus 908 communicatively connects the one or more processing unit(s) 912 with the ROM 910, the system memory 904, and the permanent storage device 902. From these various memory units, the one or more processing unit(s) 912 retrieves instructions to execute and data to process in order to execute the processes of the subject disclosure. The one or more processing unit(s) 912 can be a single processor or a multi-core processor in different implementations.

The ROM 910 stores static data and instructions that are needed by the one or more processing unit(s) 912 and other modules of the electronic system 900. The permanent storage device 902, on the other hand, may be a read-and-write memory device. The permanent storage device 902 may be a non-volatile memory unit that stores instructions and data even when the electronic system 900 is off. In one or more implementations, a mass-storage device (such as a magnetic or optical disk and its corresponding disk drive) may be used as the permanent storage device 902.

In one or more implementations, a removable storage device (such as a floppy disk, flash drive, and its corresponding disk drive) may be used as the permanent storage device 902. Like the permanent storage device 902, the system memory 904 may be a read-and-write memory device. However, unlike the permanent storage device 902, the system memory 904 may be a volatile read-and-write memory, such as random access memory. The system memory 904 may store any of the instructions and data that one or more processing unit(s) 912 may need at runtime. In one or more implementations, the processes of the subject disclosure are stored in the system memory 904, the permanent storage device 902, and/or the ROM 910. From these various memory units, the one or more processing unit(s) 912 retrieves instructions to execute and data to process in order to execute the processes of one or more implementations.

The bus 908 also connects to the input and output device interfaces 914 and 906. The input device interface 914 enables a user to communicate information and select commands to the electronic system 900. Input devices that may be used with the input device interface 914 may include, for example, alphanumeric keyboards and pointing devices (also called "cursor control devices"). The output device interface 906 may enable, for example, the display of images generated by electronic system 900. Output devices that may be used with the output device interface 906 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 9, the bus 908 also couples the electronic system 900 to one or more networks and/or to one or more network nodes, such as the server 108 shown in FIG. 1, through the one or more network interface(s) 916. In this manner, the electronic system 900 can be a part of a network of computers (such as a LAN, a wide area network ("WAN"), or an Intranet, or a network of networks, such as the Internet. Any or all components of the electronic system 900 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
    obtaining a first microphone signal from an acoustic microphone;
    obtaining a second microphone signal from a light-based microphone;
    generating a mask based at least in part on the second microphone signal from the light-based microphone; and
    detecting a sound from a source by selecting a portion of the first microphone signal that is representative of the sound based on the second microphone signal by applying the mask to at least the first microphone signal.

2. The method of claim 1, wherein the first microphone signal comprises an acoustic microphone signal, the method further comprising obtaining at least one additional acoustic microphone signal from at least one additional acoustic microphone of an acoustic microphone array that includes the acoustic microphone, and wherein selecting the portion of the first microphone signal comprises determining a plurality of acoustic subband probabilities using the acoustic microphone signal and the at least one additional acoustic microphone signal.

3. The method of claim 2, wherein selecting the portion of the first microphone signal further comprises determining a plurality of optical subband probabilities using the second microphone signal.

4. The method of claim 3, wherein:
    generating the mask comprises generating an acoustic mask using the plurality of acoustic subband probabilities and the plurality of optical subband probabilities; and
    applying the mask to at least the first microphone signal comprises applying the acoustic mask to at least the acoustic microphone signal to select the portion of the first microphone signal.

5. The method of claim 1, wherein obtaining the second microphone signal comprises projecting light from a light source of the light-based microphone onto the source of the sound and detecting vibrations of the source of the sound based on a reflected portion of the projected light that is received at a light sensor of the light-based microphone.

6. The method of claim 5, wherein the light-based microphone comprises a vibration sensor, a depth sensor, or a high frame rate image sensor.

7. The method of claim 5, further comprising aligning the first microphone signal and the second microphone signal in time to account for a difference between a time for the reflected portion of the light to travel from the source of the sound to the light sensor and a time for the sound to travel from the source of the sound to the acoustic microphone.

8. A method, comprising:
obtaining a first microphone signal from an acoustic microphone;
obtaining a second microphone signal from a light-based microphone;
aligning, in time, the first microphone signal and the second microphone signal to account for a difference between light speed and sound speed; and
generating an output audio signal containing content corresponding to a sound from a source based in part on the first microphone signal and the second microphone signal that have been aligned in time.

9. The method of claim 8, wherein aligning the first microphone signal and the second microphone signal comprises:
determining a delay time for the second microphone signal based on a cross-correlation of the first microphone signal and the second microphone signal; and
applying the delay time to the second microphone signal to align the first microphone signal and the second microphone signal.

10. The method of claim 8, wherein aligning the first microphone signal and the second microphone signal comprises:
determining a distance to the source of the sound;
determining a delay time for the second microphone signal based on the distance, the light speed, and the sound speed; and
applying the delay time to the second microphone signal to align the first microphone signal and the second microphone signal.

11. The method of claim 8, further comprising, after the aligning:
generating a first plurality of source presence probabilities based on the first microphone signal;
generating a second plurality of source presence probabilities based on the second microphone signal; and
combining the first plurality of source presence probabilities and the second plurality of source presence probabilities to generate a mask.

12. The method of claim 11, wherein generating the output audio signal containing the content corresponding to the sound from the source comprises applying the mask to the first microphone signal.

13. A system, comprising: an acoustic microphone; a vibration sensor; and one or more processors configured to: obtain a first signal from the acoustic microphone; obtain a second signal from the vibration sensor; identify a discrepancy between the first signal and the second signal; wherein identifying the discrepancy comprises: obtaining a first source separation result based on the first signal; obtaining a second source separation result based on the second signal; and determining that a variance between the first source separation result and the second source separation result contravenes a variance threshold; and steer one or both of the acoustic microphone and the vibration sensor to reduce the discrepancy.

14. The system of claim 13, wherein the one or more processors are further configured to:
monitor the discrepancy between the first signal and the second signal while steering one or both of the acoustic microphone and the vibration sensor to reduce the discrepancy; and
stop steering the one or both of the acoustic microphone and the vibration sensor when the discrepancy meets a predetermined value or range of values.

15. The system of claim 13, wherein the vibration sensor comprises a remote vibration sensor that includes:
a light source configured to project a light onto a source of a sound; and
a light sensor configured to generate the second signal responsive to a portion of the light reflected from the source of the sound and received by the light sensor.

16. The system of claim 13, wherein the vibration sensor comprises a mechanically steerable vibration sensor, and wherein the one or more processors are configured to mechanically steer the vibration sensor to reduce the discrepancy.

17. The system of claim 13, wherein the acoustic microphone is one of a plurality of acoustic microphones in a microphone array, and wherein the one or more processors are configured to perform a beam steering operation using a plurality of acoustic microphone signals each corresponding to a respective one of the plurality of acoustic microphones in the microphone array to reduce the discrepancy.

18. The system of claim 13, wherein the acoustic microphone comprises an acoustic microphone of a first electronic device, and the vibration sensor comprises a vibration sensor of a second electronic device.

19. The system of claim 13, wherein the acoustic microphone and the vibration sensor are implemented in a single device.

* * * * *